(12) United States Patent
Zhang et al.

(10) Patent No.: US 12,015,470 B2
(45) Date of Patent: Jun. 18, 2024

(54) TIMING MEASUREMENT METHOD AND RELATED DEVICE

(71) Applicant: HUAWEI TECHNOLOGIES CO., LTD., Guangdong (CN)

(72) Inventors: Fan Zhang, Chengdu (CN); Yuzhou Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 500 days.

(21) Appl. No.: 17/330,749

(22) Filed: May 26, 2021

(65) Prior Publication Data

US 2021/0281311 A1    Sep. 9, 2021

Related U.S. Application Data

(63) Continuation of application No. PCT/CN2019/121078, filed on Nov. 26, 2019.

(30) Foreign Application Priority Data

Nov. 27, 2018 (CN) .......................... 201811424884.8

(51) Int. Cl.
*H04W 24/10* (2009.01)
*H04B 7/08* (2006.01)
*H04B 17/318* (2015.01)

(52) U.S. Cl.
CPC ........... *H04B 7/088* (2013.01); *H04B 17/318* (2015.01); *H04W 24/10* (2013.01)

(58) Field of Classification Search
USPC .......................... 455/447–455; 370/329, 330
See application file for complete search history.

(56) References Cited

U.S. PATENT DOCUMENTS

| | | | |
|---|---|---|---|
| 2015/0063253 A1* | 3/2015 | Barbieri | H04L 5/0048 370/329 |
| 2015/0162968 A1 | 6/2015 | Pinheiro et al. | |
| 2018/0048375 A1* | 2/2018 | Guo | H04B 7/024 |

FOREIGN PATENT DOCUMENTS

| | | |
|---|---|---|
| CN | 1883128 A | 12/2006 |
| CN | 107250836 A | 10/2017 |
| CN | 108282813 A | 7/2018 |
| CN | 108632838 A | 10/2018 |
| CN | 108632867 A | 10/2018 |
| CN | 108811092 A | 11/2018 |
| WO | 2017123078 A1 | 7/2017 |
| WO | 2017146535 A1 | 8/2017 |
| WO | 2018202056 A1 | 11/2018 |

OTHER PUBLICATIONS

Office Action in Chinese Application No. 201811424884.8, dated Jan. 11, 2021, 11 pages.
PCT International Search Report and Written Opinion in International Application No. PCT/CN2019/121078, dated Feb. 27, 2020, Feb. 27, 2020, 17 pages.

* cited by examiner

*Primary Examiner* — Suhail Khan
(74) *Attorney, Agent, or Firm* — Fish & Richardson P.C.

(57) ABSTRACT

Example timing measurement methods and apparatus are described. One example method includes that user equipment receives M beams from a base station, where M is a positive integer. The user equipment performs timing measurement on N beams in the M beams, where the N beams are selected from the M beams based on reference signal received powers (RSRPs) of the M beams, and N is a positive integer less than or equal to M.

6 Claims, 6 Drawing Sheets

TIMING MEASUREMENT METHOD AND RELATED DEVICE

CROSS-REFERENCE TO RELATED APPLICATIONS

This application is a continuation of International Application No. PCT/CN2019/121078, filed on Nov. 26, 2019, which claims priority to Chinese Patent Application No. 201811424884.8, filed on Nov. 27, 2018. The disclosures of the aforementioned applications are hereby incorporated by reference in their entireties.

TECHNICAL FIELD

This application relates to the field of wireless network technologies, and in particular, to a timing measurement method and a related device.

BACKGROUND

With development of mobile communications technologies, for system synchronization and some mobile service applications, for example, a requirement of a positioning service, user equipment (UE) needs to measure a timing position for a received signal, and obtain a timing advance (TA), which is a delay for a signal sent by a base station to arrive at the user equipment. This has become particularly important in many systems. For example, in a time division-synchronous code division multiple access (TD-SCDMA) system of the third generation mobile communications standard, to synchronize with a base station, and ensure that a signal sent by the base station falls just within a receiving time window of the UE, and a signal sent by the UE falls just within a receiving time window of the base station, the UE needs to measure an arrival time of a downlink signal sent by the base station and determine a receiving time based on the arrival time.

In a multi-beam wireless communications system, a data channel and a measurement channel use different beams to send data. When different beams pass through different paths, data in the data channel and data in the measurement channel have different delays. Such a delay difference may cause intersymbol interference, and data demodulation is affected.

SUMMARY

Embodiments of this application provide a timing measurement method and a related device, to avoid intersymbol interference and improve data demodulation performance.

According to a first aspect, an embodiment of this application provides a timing measurement method, including: User equipment first receives M beams from a base station; and performs timing measurement on N beams in the M beams, where the N beams are selected from the M beams based on reference signal received powers RSRPs of the M beams, and N is a positive integer less than or equal to M. A plurality of beams are selected, so that multipath information covered by the plurality of selected beams covers a multipath status of a data channel, and a most possible first path is searched for, thereby ensuring that data in a measurement channel does not lag behind data in the data channel in arriving at the user equipment. This avoids intersymbol interference, and improves data demodulation performance.

In a possible design, the user equipment may select, from the M beams, a beam with a largest RSRP as an optimal beam, and select, from beams other than the optimal beam in the M beams, a target beam whose RSRP difference from the optimal beam is not less than a preset threshold, where the N beams include the optimal beam and the target beam. A plurality of beams with larger RSRPs are selected, to ensure that multipath information covered by the plurality of selected beams covers the multipath status of the data channel.

In another possible design, the user equipment may sort the M beams in descending order of RSRPs, and select the N beams whose RSRPs are front. A plurality of beams with larger RSRPs are selected, to ensure that multipath information covered by the plurality of selected beams includes the multipath status of the data channel.

In another possible design, the user equipment may determine a timing position for a received signal based on a power delay profile of each of the N beams. The timing position for the received signal is determined by using power delay profiles of the plurality of beams. This improves accuracy of the determined timing position.

In another possible design, the user equipment may determine a weight of power delay profiles of N beams, and determine a timing position for a received signal based on the weight of the power delay profile of each of the N beams.

In another possible design, the user equipment may perform first path search based on a weight of power delay profiles, to determine a path that a signal passes through, where the signal arrives at an earliest time point that corresponds to an accumulated power that exceeds a preset threshold on the power delay profile, the earliest time point is a time point at which the received signal first arrives at the user equipment, and the time point is used as a timing position for the received signal. A path that the signal that arrives at the earliest time point passes through is searched for by using the weight of the power delay profiles, so that first path search is performed, and accuracy of a determined timing position is improved.

According to a second aspect, a base station may send M beams to user equipment. The M beams are used to indicate the user equipment to perform timing measurement on N beams, where the N beams are selected from the M beams based on reference signal received powers RSRPs of the M beams, M is a positive integer, and N is a positive integer less than or equal to M. A plurality of beams are selected, so that multipath information covered by the plurality of selected beams covers a multipath status of a data channel, and a most possible first path is searched for, thereby ensuring that data in a measurement channel does not lag behind data in the data channel in arriving at the user equipment. This avoids intersymbol interference, and improves data demodulation performance.

According to a third aspect, an embodiment of this application provides a timing measurement method, including: A base station first determines a transmit beam based on a first timing estimation result of a downlink data channel and a second timing estimation result of a beam used by a downlink measurement channel; and sends identification information of the transmit beam to user equipment, where the identification information is used to indicate the user equipment to perform timing measurement on the transmit beam. An optimal transmit beam after beam weighting is determined by comparing timing estimation results. In this way, it can be ensured that the user equipment performs timing measurement on the transmit beam to obtain a more accurate timing position, and that a delay of a measurement channel is consistent with a delay of a data channel.

In a possible design, when the first timing estimation result is greater than or equal to the second timing estimation result, and a difference between the first timing estimation result and the second timing estimation result is less than a preset threshold, the base station determines a beam used by the downlink measurement channel, as the transmit beam. By comparing timing estimation results, the optimal transmit beam is determined, to ensure that the user equipment can obtain, by using the transmit beam, a timing position that is basically consistent with that of the data channel.

In another possible design, when the first timing estimation result is less than the second timing estimation result, or a difference between the first timing estimation result and the second timing estimation result is not less than a preset threshold, the base station generates a beam weight that matches the downlink data channel, and determines a transmit beam based on the beam weight. By generating a transmit beam that matches the downlink data channel, that the user equipment can obtain, by using the transmit beam, a timing position that is basically consistent with that of the data channel is ensured.

According to a fourth aspect, an embodiment of this application provides a timing measurement method, including: User equipment first receives identification information of a transmit beam sent by a base station, where the transmit beam is determined by the base station based on a first timing estimation result of a downlink data channel and a second timing estimation result of a beam used by a downlink measurement channel; and performs timing measurement on the transmit beam based on the identification information. An optimal transmit beam after beam weighting is determined by comparing timing estimation results. In this way, it can be ensured that the user equipment performs timing measurement on the transmit beam to obtain a more accurate timing position, and that a delay of a measurement channel is consistent with a delay of a data channel.

In a possible design, when the first timing estimation result is greater than or equal to the second timing estimation result, and a difference between the first timing estimation result and the second timing estimation result is less than a preset threshold, the transmit beam is a beam used by the downlink measurement channel.

In another possible design, when the first timing estimation result is less than the second timing estimation result, or a difference between the first timing estimation result and the second timing estimation result is not less than the preset threshold, the transmit beam is determined based on a generated beam weight that matches the downlink data channel.

According to a fifth aspect, an embodiment of this application provides a timing measurement method, including: User equipment first sends identification information of an optimal beam to a base station, where the identification information is used to indicate the base station to determine a wide beam that includes horizontal and vertical angles of an optimal beam; receives a wide beam sent by the base station; and performs timing measurement on the wide beam. By using the wide beam with a wider coverage angle range indicated by the base station, the user equipment may obtain more multipath information in the measurement channel, and search for a most possible first path, to ensure that data in a measurement channel does not lag behind data in a data channel in arriving at the user equipment. This avoids intersymbol interference, and improves data demodulation performance.

In a possible design, the optimal beam is a beam with a largest reference signal received power RSRP in a plurality of beams received by the user equipment from the base station. The beam with the largest RSRP is selected to ensure a wider coverage angle range of the wide beam and obtain more multipath information.

In another possible design, the user equipment may obtain a signal-to-noise ratio of each of the plurality of received beams, and then select a beam with a largest SNR (signal-to-noise ratio) from the plurality of beams as the optimal beam. The beam with the largest SNR is selected to ensure a wider coverage angle range of the wide beam and obtain more multipath information.

According to a sixth aspect, an embodiment of this application provides a timing measurement method, including: A base station first receives identification information of an optimal beam sent by user equipment, where the optimal beam is a beam with a largest reference signal received power RSRP in a plurality of beams received by the user equipment from the base station; and sends a wide beam to the user equipment, where horizontal and vertical angles included in the wide beam are horizontal and vertical angles of the optimal beam. The wide beam is used to indicate user equipment to perform timing measurement. The wide beam with a wider coverage angle range is indicated to the user equipment, so that the user equipment is enabled to obtain more multipath information in the measurement channel, and search for a most possible first path, to ensure that data in a measurement channel does not lag behind data in a data channel in arriving at the user equipment. This avoids intersymbol interference, and improves data demodulation performance.

In a possible design, the base station may periodically or aperiodically send the wide beam to the user equipment.

According to a seventh aspect, an embodiment of this application provides user equipment. The user equipment is configured to implement the methods and the functions that are performed by the user equipment in the first, fourth and fifth aspects. The user equipment is implemented by using hardware/software. The hardware/software of the user equipment includes units corresponding to the foregoing functions.

According to an eighth aspect, an embodiment of this application provides a base station. The base station is configured to implement the methods and the functions that are performed by the base station in the second, third and sixth aspects. The base station is implemented by using hardware/software. The hardware/software of the user equipment includes units corresponding to the foregoing functions.

According to a ninth aspect, an embodiment of this application provides other user equipment, including a processor, a memory, and a communications bus, where the communications bus is configured to implement connection and communication between the processor and the memory, and the processor executes a program stored in the memory, to perform the steps in the timing measurement methods according to the first, fourth, and fifth aspects.

In a possible design, the user equipment provided in embodiments of this application may include a corresponding module configured to perform behavior of the user equipment in the foregoing method designs. The module may be software and/or hardware.

According to a tenth aspect, an embodiment of this application provides another base station, including a processor, a memory, and a communications bus, where the communications bus is configured to implement connection and communication between the processor and the memory, and the processor executes a program stored in the memory, to perform the steps in the timing measurement methods according to the second, third, and sixth aspects.

In a possible design, the base station provided in embodiments of this application may include a corresponding module configured to perform behavior of the base station in the foregoing method designs. The module may be software and/or hardware.

According to an eleventh aspect, an embodiment of this application provides a computer-readable storage medium, where the computer-readable storage medium stores instructions. When the instructions are run on a computer, the computer is enabled to perform the methods according to the foregoing aspects.

According to a twelfth aspect, an embodiment of this application provides a computer program product including instructions. When the computer program product runs on a computer, the computer is enabled to perform the methods according to the foregoing aspects.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

The following describes embodiments of this application with reference to the accompanying drawings in the embodiments of this application.

Figure 1:
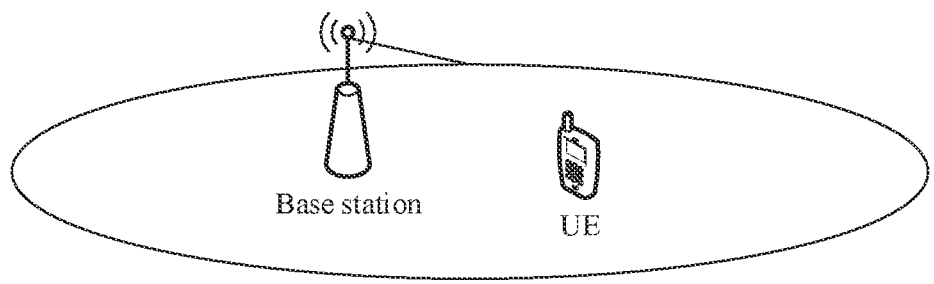
FIG. 1 is a schematic structural diagram of a wireless communications system according to an embodiment of this application.

FIG. 1 is a schematic structural diagram of a wireless communications system according to an embodiment of this application. The wireless communications system includes user equipment and a base station. The base station sends downlink data to the user equipment, encodes the data through channel coding, and modulates and transmits data obtained after channel coding to the user equipment. The user equipment may send uplink data to the base station. The uplink data may be encoded through channel coding. Encoded data is modulated and then transmitted to the base station. The user equipment may refer to a device that provides a voice and/or data connection to a user, or may be connected to a computing device such as a laptop computer or a desktop computer, or may be an independent device such as a personal digital assistant (PDA). The user equipment may also be referred to as a system, a subscriber unit, a subscriber station, a mobile station, a mobile console, a remote station, an access point, a remote terminal, an access terminal, a user terminal, a user agent, or a user apparatus. The base station may be a device configured to communicate with a terminal device, and may be an access point, a relay node, a base transceiver station (BTS), a NodeB (NB), an evolved NodeB (eNB), or a next generation NodeB (gNB). The base station is a device in an access network that communicates with user equipment over an air interface by using one or more sectors. By converting a received air interface frame into an IP (Internet protocol) packet, the base station may serve as a router between a wireless terminal and another part of the access network, and the access network may include an internet protocol network. The base station may further coordinate attribute management for the air interface. In this embodiment of this application, the wireless communications system may be used in timing measurement.

Figure 2:
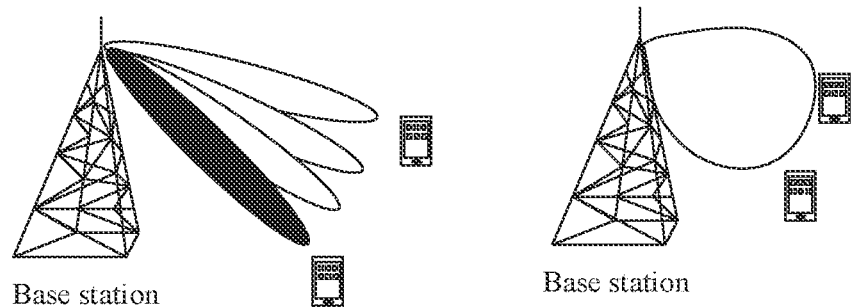
FIG. 2 is a schematic diagram of a beam wireless system according to an embodiment of this application.
Figure 3:
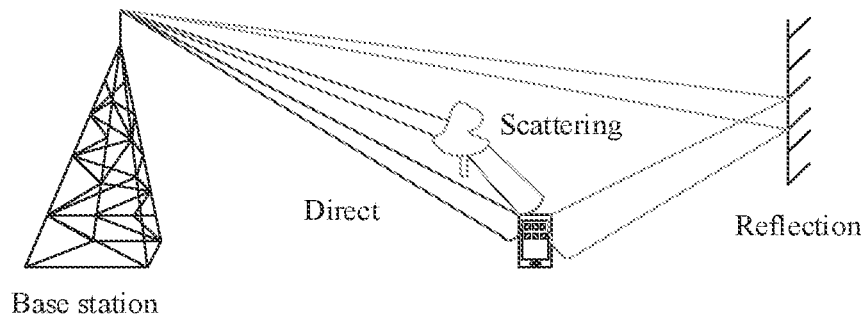
FIG. 3 is a schematic diagram of a multipath transmission system according to an embodiment of this application.

This embodiment of this application relates to a beam and multipath. For explanation of the beam, refer to FIG. 2. FIG. 2 is a schematic diagram of a beam wireless system according to an embodiment of this application. The left figure shows a multi-beam wireless communications system. A base station converges, by using different beams, multi-antenna energy to a plurality of directions to perform signal transmission. When a signal sent in a direction is aligned with user equipment by using a radio channel, the user equipment may obtain a power gain in the direction. The right figure shows a single-beam wireless communications system. A base station converges, by using one beam, multi-antenna energy to one direction to perform signal transmission. All user equipments within beam coverage may obtain a power gain. For explanation of the multipath, refer to FIG. 3. FIG. 3 is a schematic diagram of multipath transmission according to an embodiment of this application. An electromagnetic signal sent by a base station may reach user equipment in different manners, such as direct, reflection, and scattering, by using paths of different lengths. Because the paths are different, generated delays are also different.

Figure 4:
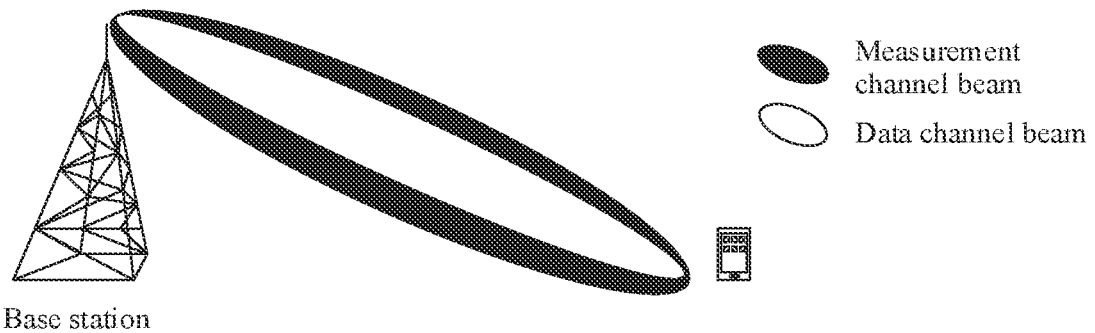
FIG. 4 is a schematic diagram of a beam transmission mode according to an embodiment of this application.

FIG. 4 is a schematic diagram of a beam transmission mode according to an embodiment of this application. Different downlink beams are generated at a plurality of transmit ports of a base station in different beam weighting modes. Different channels may have different downlink beam weighting modes and different beam coverage areas. For example, a data channel (for example, a physical downlink shared channel (PDSCH)) may calculate a beam weight through channel estimation of an uplink sounding reference signal (SRS), and then send a beam after performing beam weighting. A measurement channel performs beam weighting by using a beam weight of a fixed codebook, and then sends the beam. In a case of multipath, UE may perform timing measurement by measuring a channel, and adjust a TA.

In a relatively complex channel environment, a beam weight of a data channel is calculated based on a real-time channel, and a beam weight of a measurement channel is a beam weight of a fixed codebook. Therefore, the data channel and the measurement channel use different beams to send data. When different beams pass through different paths, a beam delay of the data channel is inconsistent with a beam delay of the measurement channel. When the beam delay of the data channel is less than the beam delay of the measurement channel, in other words, data in the data channel arrives at the UE before data in the measurement channel, intersymbol interference is generated, and data demodulation is affected. If the beam delay of the data channel is greater than the beam delay of the measurement channel, and does not exceed a length of a cyclic prefix (CP), there is no intersymbol interference, and only a timing difference exists. To resolve the foregoing technical problems, the embodiments of this application provide the following solutions.

Figure 5:
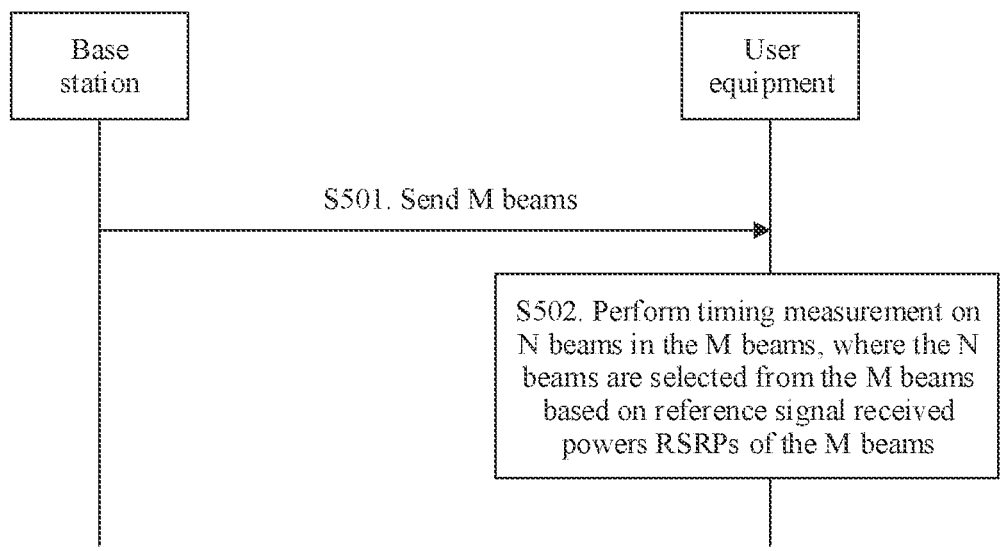
FIG. 5 is a schematic flowchart of a timing measurement method according to an embodiment of this application.

FIG. 5 is a schematic flowchart of a timing measurement method according to an embodiment of this application. As shown in the figure, steps in this embodiment of this application include the following steps.

S501. A base station sends M beams to user equipment, where M is a positive integer.

S502. The user equipment performs timing measurement on N beams in the M beams, where the N beams are selected from the M beams based on reference signal received powers (RSRP) of the M beams, and N is a positive integer less than or equal to M.

A manner of selecting the N beams from the M beams based on the reference signal received powers RSRPs of the M beams includes but is not limited to the following several optional manners.

In an implementation, the user equipment may select, from the M beams, a beam with a largest RSRP as an optimal beam; select, from beams other than the optimal beam in the M beams, a target beam whose RSRP difference from the optimal beam is not less than a preset threshold; and then form a set of beams by using the optimal beam and the target beam, where the set of beams includes N beams.

In another implementation, the user equipment may sort the M beams in descending order of the RSRPs, and select the N beams whose RSRPs are the largest.

Optionally, after selecting the N beams from the M beams, the user equipment may perform timing measurement on the N beams to obtain a power delay profile of each of the N beams. Then, a timing position for a received signal is determined based on the power delay profile of each of the N beams. The power delay profile indicates power accumulation degrees of a received signal at different time points. If power accumulation at a time point on the power delay profile exceeds a preset threshold, it indicates that at the time point, an available signal with relatively good quality arrives.

During actual implementation, the user equipment may determine a weight of the power delay profiles of the N beams; and determine the timing position for the received signal based on the weight of the power delay profiles. The timing position is a start time point at which an available received signal is obtained from a received segment of continuous time domain signals. The timing position may be used as a reference for truncating a segment of continuous time domain signals when the segment of continuous time domain signals are obtained. In other words, the user equipment may know a start position for receiving signals by using the timing position.

Further, there are a plurality of paths for a received signal to arrive at the user equipment in a range covered by a beam, and a path along which the received signal first arrives at the UE in these paths is a first path corresponding to the beam. First path search may be performed based on the weight of the power delay profiles, to determine a path that a signal passes through, where the signal arrives at an earliest time point at which an accumulated power on the power delay profile exceeds a preset threshold, the earliest time point is a time point at which the received signal first arrives at the user equipment, and the time point is used as a timing position for the received signal.

In this embodiment of this application, the user equipment selects a plurality of beams with relatively large RSRPs. and performs weighted combination on power delay profiles of the plurality of beams, to implement information combination on multipath between the plurality of beams, so that more multipath information in a measurement channel can be obtained. Multipath information covered by the plurality of selected beams covers a multipath status of a data channel, and a most possible first path is searched for, thereby ensuring that data in a measurement channel does not lag behind data in the data channel in arriving at the user equipment. This avoids intersymbol interference, and improves data demodulation performance.

Figure 6:
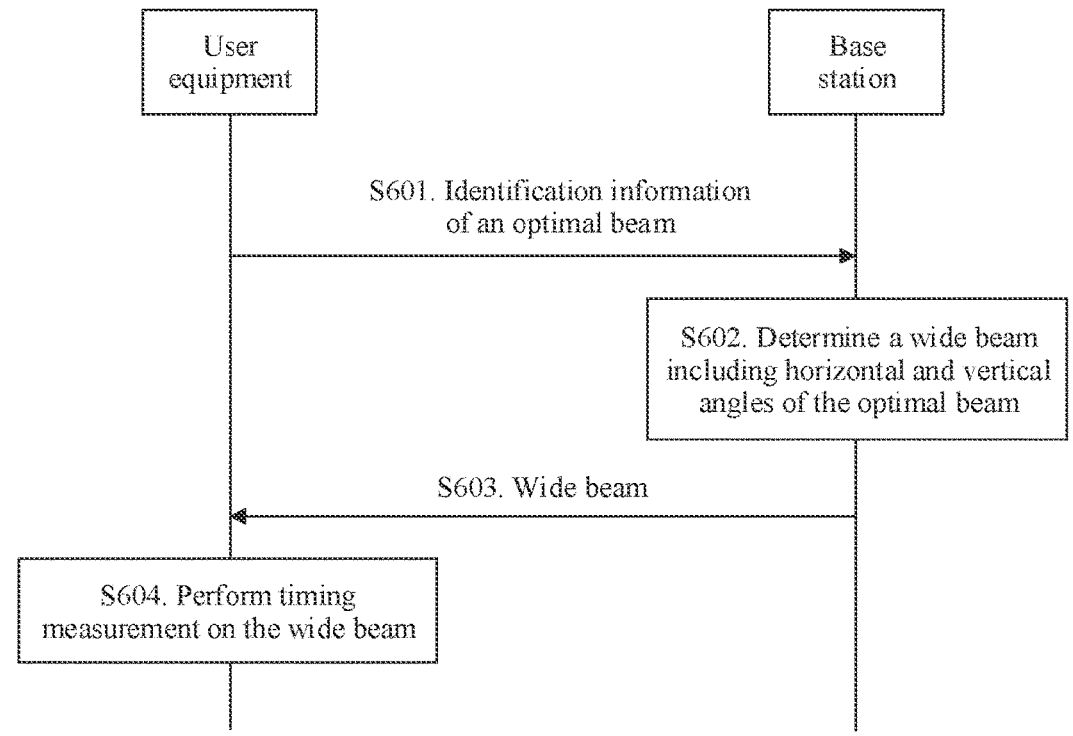
FIG. 6 is a schematic flowchart of another timing measurement method according to an embodiment of this application.

FIG. 6 is a schematic flowchart of another timing measurement method according to an embodiment of this application. As shown in the figure, steps in this embodiment of this application include the following steps.

S601. User equipment sends identification information of an optimal beam to a base station, where the optimal beam is a beam with a largest reference signal received power RSRP in a plurality of beams received by the user equipment from the base station.

During actual implementation, the user equipment may obtain an RSRP of each of the plurality of received beams, and then select the beam with the largest RSRP from the plurality of beams as the optimal beam. Alternatively, the user equipment obtains a signal-to-noise ratio (signal noise ratio, SNR) of each of the plurality of received beams, and then selects the beam with a largest SNR from the plurality of beams as the optimal beam.

S602. The base station determines a wide beam including horizontal and vertical angles of the optimal beam.

S603. The base station sends the wide beam to the user equipment, where the horizontal and vertical angles included in the wide beam are the horizontal and vertical angles of the optimal beam.

S604. The user equipment performs timing measurement on the wide beam. The timing measurement is used to determine a timing position for a received signal. The timing position is a start time point at which an available received signal is obtained from a received segment of continuous time domain signals.

Figure 7:
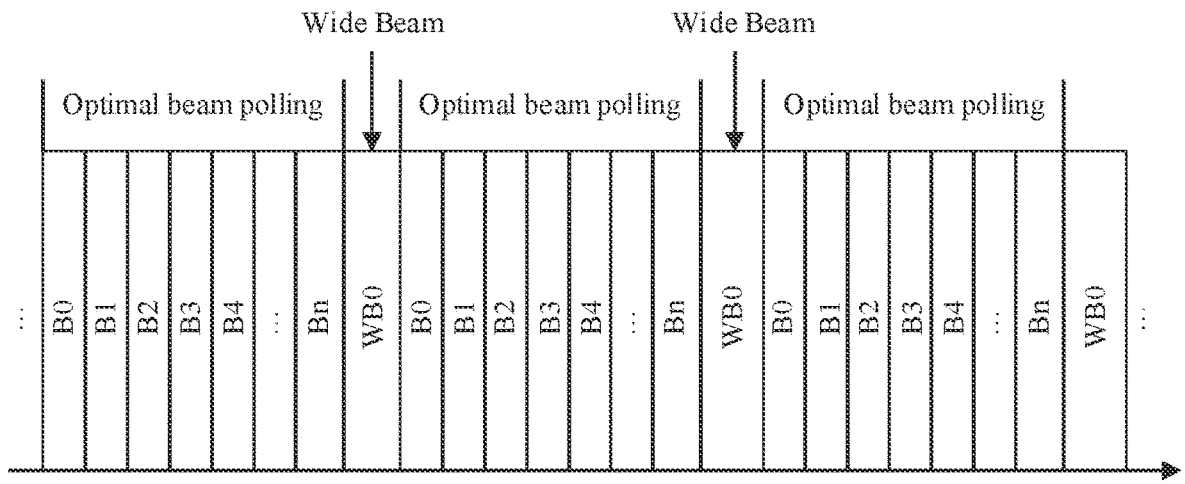
FIG. 7 is a schematic diagram of a beam transmission mode according to an embodiment of this application.

For example, as shown in FIG. 7, the base station may simultaneously or continuously send a plurality of beams. The user equipment polls the plurality of beams, selects an optimal beam, and reports the optimal beam to the base station. Then, the base station periodically or aperiodically sends one wide beam to the user equipment, and indicates the user equipment to perform timing measurement on the wide beam. Because movement of the user equipment causes a change in an external environment, the timing measurement also changes accordingly. Therefore, the timing measurement needs to be performed continuously.

In this embodiment of this application, the base station may determine, based on the horizontal and vertical angles of the optimal beam, the wide beam including the horizontal and vertical angles of the optimal beam. By using the wide beam with a wider coverage angle range, the user equipment obtains more multipath information in the measurement channel, and searches for a most possible first path, to ensure that data in a measurement channel does not lag behind data in a data channel in arriving at the user equipment. This avoids intersymbol interference, and improves data demodulation performance.

Figure 8:
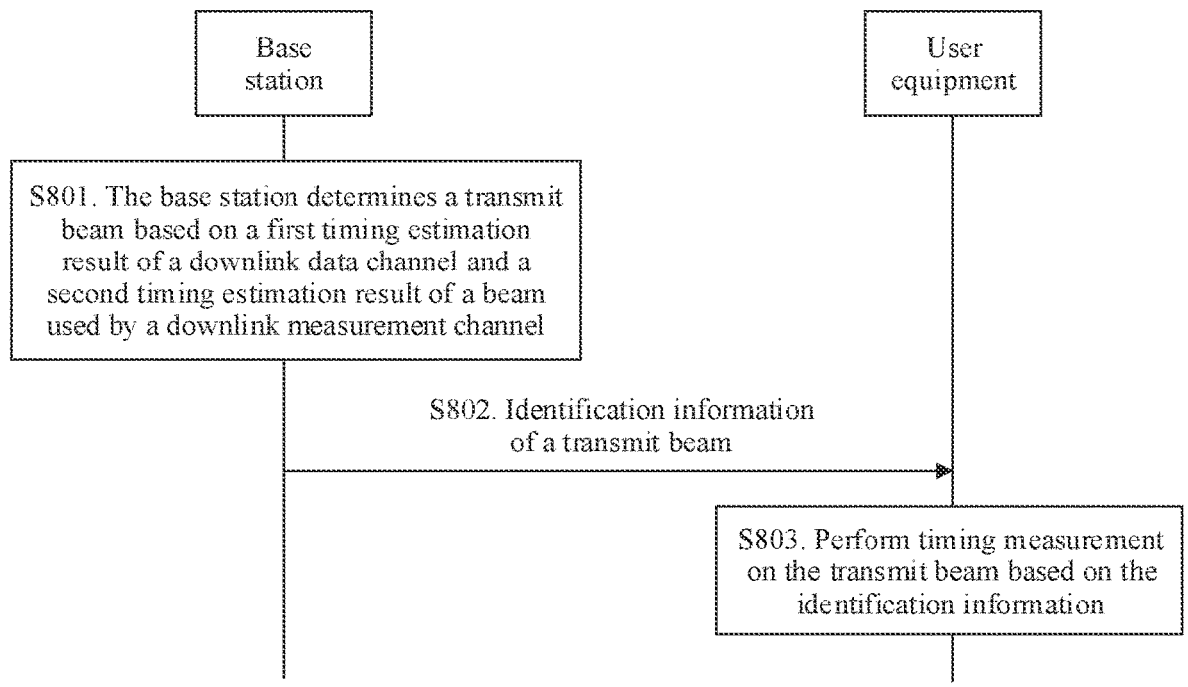
FIG. 8 is a schematic flowchart of yet another timing measurement method according to an embodiment of this application.

FIG. 8 is a schematic flowchart of yet another timing measurement method according to an embodiment of this application. As shown in the figure, steps in this embodiment of this application include: S801. A base station determines a transmit beam based on a first timing estimation result of a downlink data channel and a second timing estimation result of a beam used by a downlink measurement channel.

During specific implementation, the base station may first obtain the first timing estimation result of the downlink data channel and the second timing estimation result of the beam used by the downlink measurement channel. For example, for the downlink data channel, the base station may first determine a beamforming (BF) weight of the data channel through uplink channel estimation, then determine a downlink channel through reciprocity between an uplink channel and a downlink channel, determine the downlink data channel based on the downlink channel and the BF weight, and finally, calculate the first timing estimation result of the downlink data channel based on the downlink data channel. For the downlink measurement channel, the base station may first determine a downlink channel through reciprocity between an uplink channel and a downlink channel, then determine different downlink measurement channels with reference to weighting of different beams, and finally determine the second timing estimation result of each downlink measurement channel based on different downlink measurement channels. Then, the transmit beam is determined in the following manners.

In a case in which timing measurement is performed based on a common channel, the second timing estimation result of each downlink measurement channel is compared with the first timing estimation result of the downlink data channel. If the first timing estimation result of the downlink data channel is greater than or equal to a second timing estimation result of a downlink measurement channel, that is, data in the downlink measurement channel does not lag behind data in the downlink data channel in arriving at the user equipment; and if a difference between the first timing estimation result of the downlink data channel and a second timing estimation result of a downlink measurement channel is less than a preset threshold, that is, a time length by which the data in the downlink measurement channel arrives at the user equipment earlier than the data in the downlink data channel falls within a specific range, a beam used by the downlink measurement channel is determined as the transmit beam.

In a case in which timing measurement is performed based on a dedicated channel, a second timing estimation result of the dedicated downlink measurement channel is compared with the first timing estimation result of the downlink data channel. If the first timing estimation result is less than the second timing estimation result, or if a difference between the first timing estimation result and the second timing estimation result is not less than the preset threshold, a beam weight that matches the downlink data channel is generated. Then, beam weighting is performed on a plurality of transmit ports of the base station based on the beam weight, to generate the transmit beam of the downlink measurement channel. Alternatively, a beam used by the dedicated downlink measurement channel may be determined as the transmit beam.

S802. The base station sends identification information of the transmit beam to the user equipment.

S803. The user equipment performs timing measurement on the transmit beam based on the identification information. The timing measurement is used to determine a timing position for a received signal. The timing position is a start time point at which an available received signal is obtained from a received segment of continuous time domain signals.

In this embodiment of this application, a timing estimation result of the downlink data channel and a timing estimation result of a plurality of downlink measurement channels are determined through uplink channel estimation, and the timing estimation result of the downlink data channel is compared with an estimation result of each downlink measurement channel, to determine, after beam weighting, an optimal transmit beam. In this way, it can be ensured that the user equipment performs timing measurement on the transmit beam to obtain a more accurate timing position, and that a delay of a measurement channel is consistent with a delay of a data channel.

Figure 9:
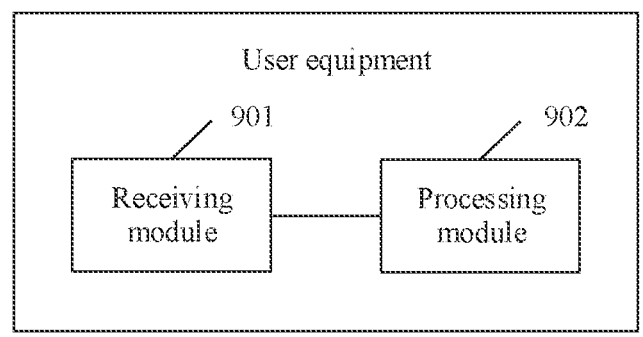
FIG. 9 is a schematic structural diagram of user equipment according to an embodiment of this application.

FIG. 9 is a schematic structural diagram of user equipment according to an embodiment of this application. As shown in the figure, the user equipment in this embodiment of this application includes a receiving module 901 and a processing module 902.

In an embodiment, the receiving module 901 is configured to receive M beams from a base station, where M is a positive integer. The processing module 902 is configured to perform timing measurement on N beams in the M beams, where the N beams are selected from the M beams based on reference signal received powers RSRPs of the M beams, and N is a positive integer less than or equal to M.

Optionally, the processing module 902 is further configured to: select a beam with a largest RSRP from the M beams as an optimal beam; and select, from beams other than the optimal beam in the M beams, a target beam whose RSRP difference from the optimal beam is not less than a preset threshold, where the N beams include the optimal beam and the target beam.

Optionally, the processing module 902 is further configured to determine a timing position for a received signal based on the power delay profile of each of the N beams.

Optionally, the processing module 902 is further configured to: determine a weight of the power delay profiles of the N beams; and determine the timing position for the received signal, based on the weight of the power delay profiles.

Optionally, the processing module 902 is further configured to: determine, based on the weight of the power delay profiles, an earliest time point at which the received signal arrives at the user equipment; and use the time point as the timing position.

In another embodiment, the receiving module 901 is configured to receive identification information of a transmit beam sent by a base station, wherein the transmit beam is determined by the base station based on a first timing estimation result of a downlink data channel and a second timing estimation result of a beam used by a downlink measurement channel; and the processing module 902 is configured to perform timing measurement on the transmit beam based on the identification information.

When the first timing estimation result is greater than or equal to the second timing estimation result, and a difference between the first timing estimation result and the second timing estimation result is less than a preset threshold, the transmit beam is a beam used by the downlink measurement channel.

When the first timing estimation result is less than the second timing estimation result, or a difference between the first timing estimation result and the second timing estimation result is not less than the preset threshold, the transmit beam is determined based on a generated beam weight that matches the downlink data channel.

It should be noted that, for implementation of modules, refer to corresponding descriptions of the method embodiments shown in FIG. 5, FIG. 6, and FIG. 8. The modules perform the methods and the functions performed by the user equipment in the foregoing embodiments.

Figure 10:
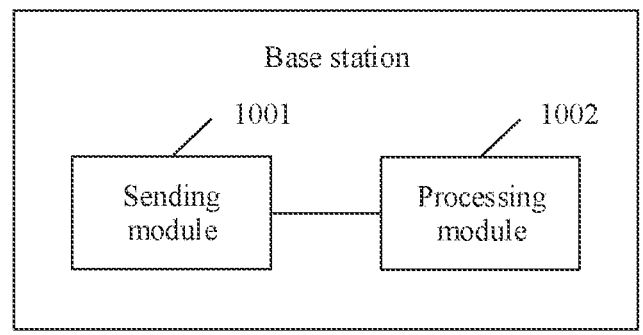
FIG. 10 is a schematic structural diagram of a base station according to an embodiment of this application.

FIG. 10 is a schematic structural diagram of a base station according to an embodiment of this application. As shown in the figure, the base station in this embodiment of this application may include a sending module 1001 and a processing module 1002.

In an embodiment, the sending module 1001 is configured to send M beams to user equipment. The M beams are used to indicate the user equipment to perform timing measurement on N beams, where the N beams are selected from the M beams based on reference signal received powers RSRPs of the M beams, M is a positive integer, and N is a positive integer less than or equal to M.

In another embodiment, the processing module 1002 is configured to: determine a transmit beam based on a first timing estimation result of a downlink data channel and a second timing estimation result of a beam used by a downlink measurement channel; and the sending module 1001 is configured to send identification information of the transmit beam to user equipment, where the identification information is used to indicate the user equipment to perform timing measurement on the transmit beam.

Optionally, the processing module 1002 is further configured to: when the first timing estimation result is greater than or equal to the second timing estimation result, and a difference between the first timing estimation result and the second timing estimation result is less than a preset threshold, determine a beam used by the downlink measurement channel, as the transmit beam.

Optionally, the processing module 1002 is further configured to: when the first timing estimation result is less than the second timing estimation result, or a difference between the first timing estimation result and the second timing estimation result is not less than the preset threshold, generate a beam weight that matches the downlink data channel; and determine the transmit beam based on the beam weight.

It should be noted that, for implementation of modules, refer to corresponding descriptions of the method embodiments shown in FIG. 5. FIG. 6, and FIG. 8. The modules perform the methods and the functions performed by the base station in the foregoing embodiments.

Figure 11:
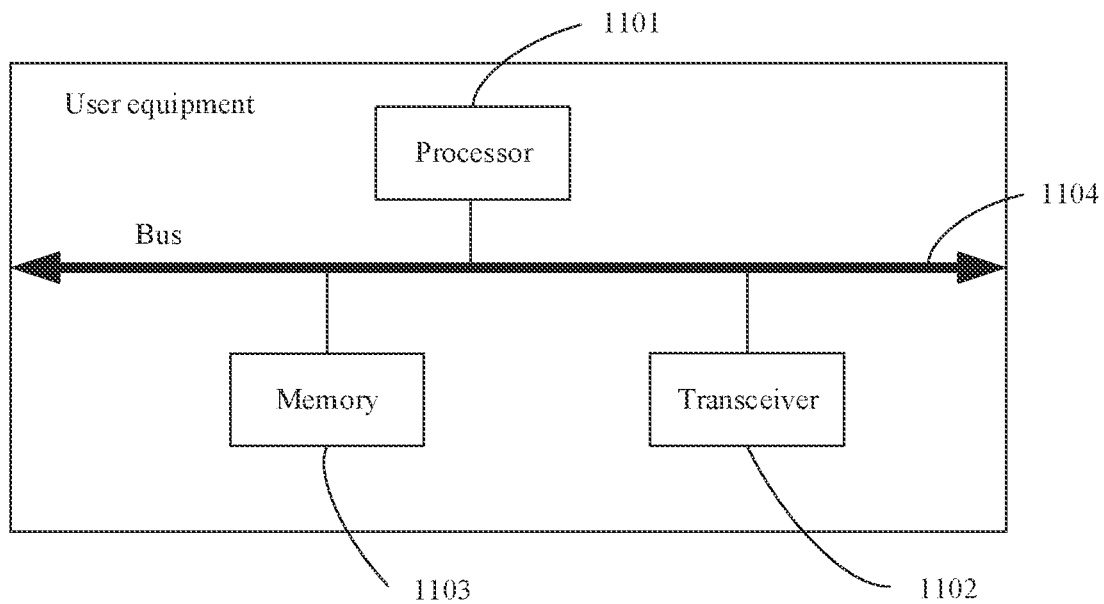
FIG. 11 is a schematic structural diagram of other user equipment according to an embodiment of this application.

FIG. 11 is a schematic structural diagram of other user equipment according to this application. As shown in the figure, the access point may include, at least one processor 1101, at least one transceiver 1102, at least one memory 1103, and at least one communications bus 1104.

The processor 1101 may be a central processing unit, a general-purpose processor, a digital signal processor, an application-specific integrated circuit, a field programmable gate array or another programmable logic device, a transistor logic device, a hardware component, or any combination thereof. The processing module may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The communications bus 1104 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus. The communications bus 1104 is configured to implement connection and communication between these components. The transceiver 1102 in the device in this embodiment of this application is configured to communicate with another network element. The memory 1103 may include a volatile memory, for example, a nonvolatile dynamic random access memory (NVRAM), a phase-change random access memory (PRAM), or a magnetoresistive random access memory (MRAM). The memory 1103 may further include a nonvolatile memory, for example, at least one magnetic disk storage device, an electrically erasable programmable read-only memory (EEPROM), a flash memory device such as a NOR flash memory or a NAND flash memory, or a semiconductor device such as a solid-state drive (SSD). Optionally, the memory 1103 may be at least one storage apparatus far away from the processor 1101. The memory 1103 stores a group of program code, and the processor 1101 executes a program that is in the memory 1103 and that is executed by the access point.

In another embodiment, M beams are received from a base station by using the transceiver 1102, where M is a positive integer. Timing measurement is performed on N beams in the M beams, where the N beams are selected from the M beams based on reference signal received powers RSRPs of the M beams, and N is a positive integer less than or equal to M.

Optionally, the processor 1101 is further configured to:
select a beam with a largest RSRP from the M beams as an optimal beam; and
select from beams other than the optimal beam in the M beams, a target beam whose RSRP difference from the optimal beam is not less than a preset threshold, where the N beams include the optimal beam and the target beam.

Optionally, the processor 1101 is further configured to:
determine a timing position for a received signal is determined based on the power delay profile of each of the N beams.

Optionally, the processor 1101 is further configured to:
determine a weight of the power delay profiles of the N beams; and
determine the timing position for the received signal based on the weight of the power delay profiles.

Optionally, the processor 1101 is further configured to:
determine, based on the weight of the power delay profiles, an earliest time point at which the received signal arrives at the user equipment; and
use the time point as the timing position.

In another embodiment, identification information of a transmit beam sent by a base station is received by using the transceiver 1102, where the transmit beam is determined by the base station based on a first timing estimation result of a downlink data channel and a second timing estimation result of a beam used by a downlink measurement channel. Timing measurement is performed on the transmit beam based on the identification information.

When the first timing estimation result is greater than or equal to the second timing estimation result, and a difference between the first timing estimation result and the second timing estimation result is less than a preset threshold, the transmit beam is a beam used by the downlink measurement channel.

When the first timing estimation result is less than the second timing estimation result, or a difference between the first timing estimation result and the second timing estimation result is not less than the preset threshold, the transmit beam is determined based on a generated beam weight that matches the downlink data channel.

Optionally, the processor 1101 is further configured to:

Further, the processor may further cooperate with the memory and the transceiver to perform operations of the user equipment in the foregoing embodiments of this application.

Figure 12:
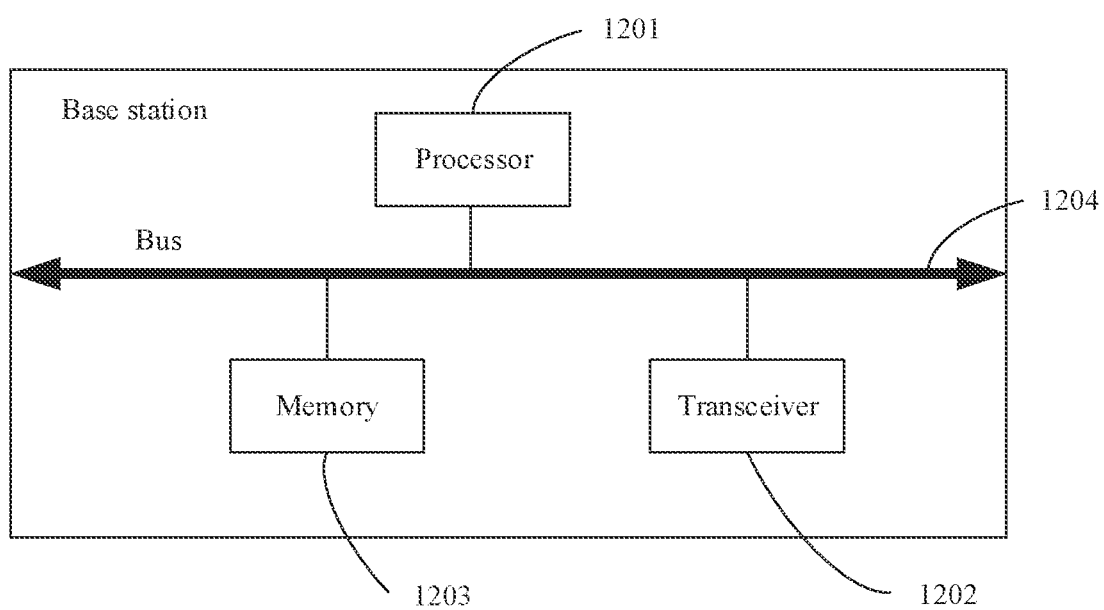
FIG. 12 is a schematic structural diagram of another base station according to an embodiment of this application.

FIG. 12 is a schematic structural diagram of another base station according to this application. As shown in the figure, the base station may include: at least one processor 1201, at least one transceiver 1202, at least one memory 1203, and at least one communications bus 1204.

The processor 1201 may be processors of various types mentioned above. The communications bus 1204 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 12, but this does not mean that there is only one bus or only one type of bus. The data communications bus 1204 is configured to implement connection and communication between these components. The transceiver 1202 in the device in this embodiment of this application is configured to communicate with another network element. The memory 1203 may be memories of various types mentioned above. Optionally, the memory 1203 may be at least one storage apparatus far away from the processor 1201. The memory 1203 stores a group of program code, and the processor 1201 executes a program that is in the memory 1203 and that is executed by the user equipment.

In an embodiment, M beams are sent to the user equipment by using the transceiver 1202. The M beams are used to indicate the user equipment to perform timing measurement on N beams, where the N beams are selected from the M beams based on reference signal received powers RSRPs of the M beams, M is a positive integer, and N is a positive integer less than or equal to M.

In another embodiment, a transmit beam is determined based on a first timing estimation result of a downlink data channel and a second timing estimation result of a beam used by a downlink measurement channel. Identification information of the transmit beam is sent to the user equipment by using the transceiver 1202, where the identification information is used to indicate the user equipment to perform timing measurement on the transmit beam.

Optionally, the processor 1201 is further configured to:
when the first timing estimation result is greater than or equal to the second timing estimation result, and a difference between the first timing estimation result and the second timing estimation result is less than a preset threshold, determine a beam used by the downlink measurement channel, as the transmit beam.

Optionally, the processor 1201 is further configured to:
when the first timing estimation result is less than the second timing estimation result, or a difference between the first timing estimation result and the second timing estimation result is not less than the preset threshold, generate a beam weight that matches the downlink data channel; and
determine the transmit beam based on the beam weight.

Further, the processor may further cooperate with the memory and the transceiver to perform operations of the base station in the foregoing embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, the procedure or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A timing measurement method, wherein the method comprises:
receiving, by user equipment, M beams from a base station, wherein M is a positive integer;
performing, by the user equipment, timing measurement on N beams in the M beams, wherein the N beams are selected from the M beams based on reference signal received powers (RSRPs) of the M beams, and wherein N is a positive integer less than or equal to M; and
determining, by the user equipment, a timing position for a received signal based on a weight of power delay profiles of the N beams, wherein the power delay profiles are obtained through timing measurement.

2. The method according to claim 1, wherein that the N beams are selected from the M beams based on reference signal received powers (RSRPs) of the M beams comprises:
selecting, by the user equipment, a beam with a largest RSRP from the M beams as an optimal beam;
selecting, by the user equipment from beams other than the optimal beam in the M beams, a target beam whose RSRP difference from the optimal beam is not less than a preset threshold; and
wherein the N beams comprise the optimal beam and the target beam.

3. The method according to claim 1, wherein the determining, by the user equipment, the timing position for the received signal based on the weight of the power delay profiles comprises:

determining, by the user equipment based on the weight of the power delay profiles, an earliest time point at which the received signal arrives at the user equipment; and using, by the user equipment, the earliest time point as the timing position.

4. A device, comprising:

at least one processor; and one or more memories coupled to the at least one processor and storing programming instructions for execution by the at least one processor to:

receive M beams from a base station, wherein M is a positive integer;

perform timing measurement on N beams in the M beams, wherein the N beams are selected from the M beams based on reference signal received powers (RSRPs) of the M beams, and wherein N is a positive integer less than or equal to M; and determine a timing position for a received signal based on a weight of power delay profiles of the N beams, wherein the power delay profiles are obtained through timing measurement.

5. The device according to claim 4, wherein the one or more memories store the programming instructions for execution by the at least one processor further to:

select a beam with a largest RSRP from the M beams as an optimal beam; and select, from beams other than the optimal beam in the M beams, a target beam whose RSRP difference from the optimal beam is not less than a preset threshold; and wherein the N beams comprise the optimal beam and the target beam.

6. The device according to claim 4, wherein determining the timing position for the received signal based on the weight of the power delay profiles comprises:

determining, based on the weight of the power delay profiles, an earliest time point at which the received signal arrives at the device; and using the earliest time point as the timing position.

* * * * *